Feb. 4, 1930.                    W. RIENKS                    1,745,913
                            HEAT MEASURING APPARATUS
                              Filed May 16, 1928
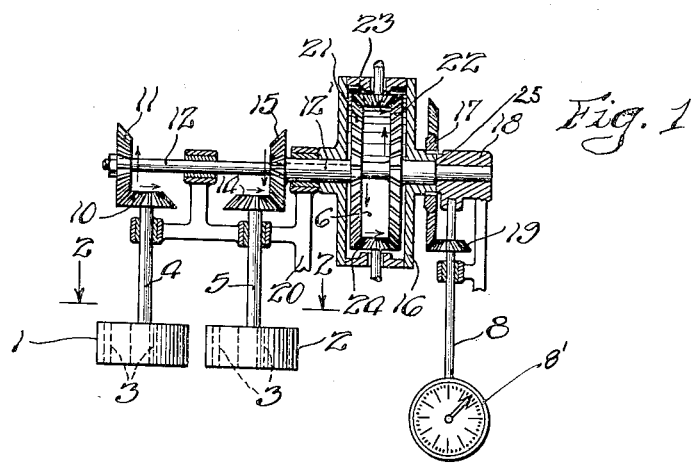
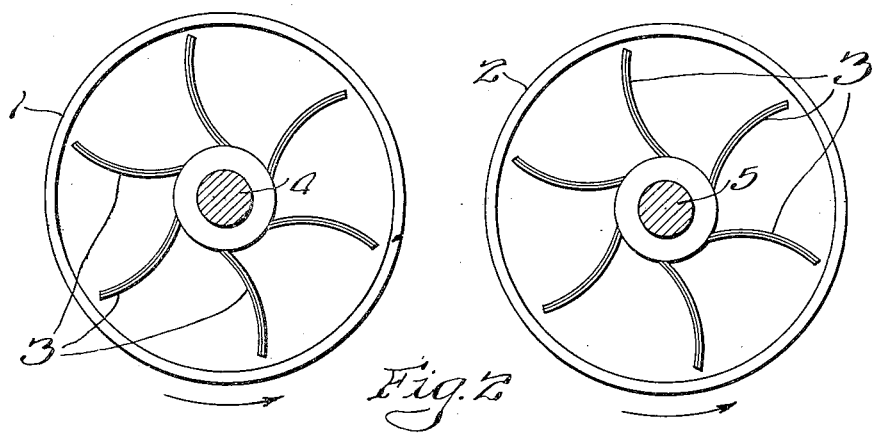
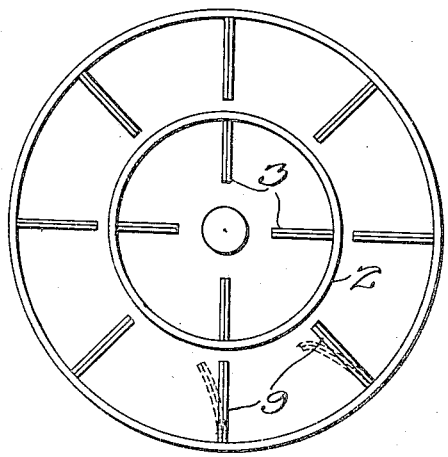
Inventor:
William Rienks,
By Nissen & Crane,
Att'ys.

Patented Feb. 4, 1930

1,745,913

UNITED STATES PATENT OFFICE

WILLIAM RIENKS, OF ROTTERDAM, NETHERLANDS

HEAT-MEASURING APPARATUS

Application filed May 16, 1928, Serial No. 278,299, and in the Netherlands May 14, 1927.

The present invention relates to a device for measuring the amount of heat given up by gases or liquids in heating apparatus.

One object of my invention resides in the provision of apparatus that will register the difference between the heat in the supply pipe and the heat in the return pipe, thus measuring the amount of heat supplied to the heating apparatus with which my invention is associated.

Another object of the invention is the construction of apparatus that it sensitive and capable of measuring a very small heat consumption.

Other objects of the invention reside in the combination and arrangement of parts described in the accompanying description.

Fig. I is a diagrammatic view of the device.

Fig. II is an elevation of the indicating wheels, and

Fig. III shows a modified arrangement of the indicating wheels.

The numerals 1 and 2 represent the indicating wheels. One of these wheels is rotatably mounted within the conduit or in a measuring chamber through which the heating fluid passes to the heating apparatus and the other indicator wheel is rotatably mounted within the return conduit or in a measuring chamber through which the heating fluid flows away from the heating apparatus. These indicating wheels are provided with vanes 3 which are constructed so that they will flex or bend over under the influence of heat. The vanes may be constructed to perform this function in any suitable manner; for instance, the vanes 3 may be made by fastening together layers of metals having different coefficients of expansion.

The indicating wheels 3 are arranged in their respective conduits so that the moving fluid will rotate the wheels in the same direction as indicated by the arrows in Fig. II. The wheels 3 are carried by shafts 4 and 5 journalled in suitable bearings. The shaft 4 has a gear 10 meshing with a gear 11 on a shaft 12. The shaft 5 has a gear 14 meshing with a gear 15 rigid with a hollow shaft 12′ journalled in a bearing in the supporting structure 20. A casing 16 within which are journalled the pinions 23 and 24, arranged as is usual in a differential, is rotatably mounted at one side on the hollow shaft 12′ and is trunnioned at the other side on the hub 25 of the gear 22 and the reduced end of the hub 25 is journalled in the bearing 18. The gears 15 and 21 are rigidly connected by the hollow shaft 12′ and the gears 11 and 22 are rigidly connected by the shaft 12 passing through the hollow shaft 12′. It will be seen therefore that the casing 16 is journalled on the shaft 12′ which may be considered as a hub of the bevel gear 21 and upon the hub 25 of the bevel gear 22 and that the gears 21 and 22 are rotatable within the casing 16.

In differential arrangements as are ordinarily used, the casing 16 would be the driven element driving the shafts 12 and 12′ at the same speed providing the resistance offered by these shafts were the same. In this case the casing 16, the gears 21, 22, 23 and 24 would all turn as a unit. If, however, one of the shafts, for instance the shaft 12, offers more resistance to motion than does the shaft 12′ or even if the latter shaft is turned in the reverse direction, the casing 16 will still rotate because of the arrangement of the pinions 23 and 24, these pinions merely rolling around the relatively stationary or reversely turning gear. In the present arrangement this action is reversed as the gears 21 and 22 are driven by the indicating wheels. These wheels are arranged to rotate in the same direction but they drive the shafts 12 and 12′ in opposite directions, as clearly shown in Fig. I. When the inlet and outlet conduits are at the same temperature, the condition that would exist if no loss of heat took place, the angular positions of the vanes 3 in both wheels are the same and consequently the tendency of these wheels to rotate under the influence of the moving fluid would be the same. In this case the pinions 24 simply rotate about their axes because of the unequal and opposite rotative movement of the gears 21 and 22 and the casing 16 and the gear 17 connected thereto remain stationary and hence there is no movement of the driving shaft 8 of the counting or registering mechanism diagrammatically shown at 8', which shaft is driven by the gear 17 meshing with the gear 19 rigid with the shaft 8. If, however, the temperature of the inlet conduit is higher than that of the outlet conduit the flexing of the vanes of the wheel in the inlet conduit will cause the wheels in the two conduits to rotate at different rates of speed.

The differential arrangement will, as explained above, permit this motion. One of the gears, for instance 21, may be considered to be rotating as indicated by the arrow thereon in Fig. I while the slower moving gear 22 may be considered as being stationary with respect to the gear 21. The pinions 23 and 24 will then roll around the gear 22 revolving the casing 16 in a clockwise direction as viewed from the left of Fig. I. The gear 17 and hence the recording mechanism driven by shaft 8 will therefore be moved in exact relation to the different rates of rotation of the wheels 1 and 2, which is a measure of the heat conveyed to the heating apparatus.

In the form of the invention shown in Fig. III, the vane wheels are mounted directly upon the shafts 12 and 12'. In this case the conduits are concentric and the vanes 3 and 9 extend inwardly from their respective wheels. The fluid flows to and from the heating apparatus through the center conduit and through the annular space between the conduits, the vanes 9 extending into the annular conduit and the vanes 3 extending into the center conduit. The flexing action of the vanes showing the change in the angular position of the vanes is shown in Fig. III. This change in angular position of the vanes causes the indicating wheel to turn faster or slower in the measuring chamber for the supply than in that of the return, depending on the order of succession of the bimetal in the vanes, the result being that the angle of the vanes increases or diminishes owing to the increase of temperature.

In Fig. I the wheels are arranged to rotate in the same direction, the connecting gearing to the shafts 12 and 12' being such as to rotate these shafts in opposite directions. However, it will be apparent that the wheels 1 and 2 might be arranged to rotate in different directions, appropriate gearing to be provided to rotate the shafts 12 and 12' in opposite directions. When the arrangement shown in Fig. III is used the direction of fluid flow will be such as to rotate the shafts 12 and 12' in opposite directions.

I claim:

1. Heat measuring apparatus comprising a rotatable member adapted to be positioned within the inlet conduit of heating apparatus, a rotatable member adapted to be positioned within the outlet conduit of said heating apparatus, said members being rotatable by the fluid in their respective conduits and rotatable at different speeds when the fluid in said conduits are at different temperatures, and mechanism responsive to the difference in speed of rotation of said members for actuating a registering apparatus.

2. Heat measuring apparatus comprising a rotatable member adapted to be positioned within the inlet conduit of heating apparatus, a rotatable member adapted to be positioned within the outlet conduit of said heating apparatus, said members being rotatable by the fluid in their respective conduits and rotatable at the same speed when the fluid in said conduits is at the same temperature and to rotate at different speeds when the fluid in each of said conduits is at a different temperature than in the other of said conduits, and mechanism responsive to the difference in speed of rotation of said members for actuating a registering mechanism.

3. Heat measuring apparatus comprising a rotatable member adapted to be positioned within the inlet conduit of heating apparatus, a rotatable member adapted to be positioned within the outlet conduit of said heating apparatus, said members including means responsive to velocity and temperature changes of the fluid within said conduits for varying the speed of rotation of said members, and mechanism actuated by the difference in speed of rotation of said members for actuating a registering means.

4. Heat measuring apparatus comprising a rotatable member adapted to be positioned within the inlet conduit of heating apparatus, a rotatable member adapted to be positioned within the outlet conduit of said heating apparatus, said members including vanes actuated by the flow of fluid to thereby rotate said members, the angular positions of which change in response to temperature change, and mechanism responsive to difference in speed of said members for actuating a registering apparatus.

5. Heat measuring apparatus comprising fluid actuated members rotatable by fluid passing said rotatable members, means on said rotatable members for causing said members to rotate at speeds proportional to the temperature of the actuating fluid, and differential mechanism responsive to the difference in speed of said members for actuating a registering mechanism or the like.

6. Heat measuring apparatus comprising fluid actuated rotatable members having means thereon adapted to react with an actuating fluid flowing thereby, said rotatable members being rotative by said last mentioned means and at speeds proportional to the temperature of the actuating fluid, gears connected with said members for rotation in opposite directions, and means connecting said gears, the rotation of said last mentioned means actuating a registering mechanism, said last mentioned means remaining stationary except when unequal turning effects are applied to said gears.

7. Heat measuring apparatus comprising fluid actuated rotatable members, said members including vanes the angular positions of which change in response to temperature changes, gears connected with said members for rotation in opposite directions, and means connecting said gears, the rotation of which actuates a recording mechanism, said means remaining stationary except when said rotatable members tend to rotate at different speeds.

8. Heat measuring apparatus comprising fluid actuated rotatable members having means thereon adapted to react with a fluid coming into engagement therewith, the actuation of said last mentioned means causing said rotatable members to rotate at speeds proportional to the temperature of the actuating fluid, gears connected to said members for rotation in opposite directions, a rotatable element, pinions journaled in said element and meshing with said gears, and mechanism actuated by said rotatable element adapted to be connected to a registering means.

9. Heat measuring apparatus comprising fluid rotatable members having means thereon adapted to be actuated by the flow of fluid thereagainst, said last mentioned means being adapted to actuate said rotatable members at speeds proportional to the temperature of the actuating fluid coming into engagement therewith, a hollow shaft driven by another of said members, a shaft extending through said hollow shaft and driven in the opposite direction from said first named shaft by one of said members, a gear carried by each of said shafts in spaced relation to each other, a casing journaled on said hollow shaft, pinions journaled in said casing and meshing with said gears, and mechanism actuated by said casing adapted to be connected to a registering means.

10. Heat measuring apparatus comprising a member having means thereon adapted to be actuated by the fluid coming into engagement therewith, said means being adapted to actuate said member an amount proportional to the temperature of the inlet fluid to a heating apparatus, a second member constructed in substantially the same manner as said first member and moved by the engagement therewith of the outlet fluid of said heating apparatus, and mechanism responsive to any difference in the speed of movement of said members for actuating a registering mechanism.

11. Heat measuring apparatus comprising a rotatable member adapted to be positioned within the inlet conduit of a heating apparatus, said rotatable member adapted to be rotated by fluid passing through said conduit and having vanes thereon constructed so as to change their shape if and when there is a temperature change in the fluid passing through said conduit to thereby change the speed of rotation of said rotatable member, a second rotatable member similar to the first rotatable member adapted to be located in the outlet conduit of said heating apparatus, and means responsive to the difference in speed of rotation of said members for actuating a registering mechanism.

12. A device as claimed in claim 11 in which the vanes are constructed of superimposed layers of metal having different co-efficients of expansion.

13. Heat measuring apparatus adapted to be located in a conduit through which the fluid is adapted to flow comprising a rotatable member having vanes thereon adapted to be moved by the flow of fluid through said conduit and being so constructed as to change their shape due to temperature changes of the fluid and to thereby change the speed of rotation of said vanes and said rotatable member upon which they are mounted.

14. A device as claimed in claim 13 in which the vanes are constructed of a plurality of layers of metal, each layer having a different co-efficient of expansion.

In testimony whereof I have signed my name to this specification on this seventh day of May, A. D. 1928.

WILLIAM RIENKS.